(12) United States Patent
Kwon et al.

(10) Patent No.: US 8,072,556 B2
(45) Date of Patent: Dec. 6, 2011

(54) LIQUID CRYSTAL DISPLAY HAVING SEPARATE CONNECTION ELEMENT TO COUPLE UPPER AND LOWER CONTAINERS TOGETHER

(75) Inventors: Yoon-soo Kwon, Anyang-si (KR); Jung-tae Kang, Suwon-si (KR); Jin-ho Ha, Suwon-si (KR); Woong-jae Chang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 12/131,587

(22) Filed: Jun. 2, 2008

(65) Prior Publication Data
US 2009/0128731 A1   May 21, 2009

(30) Foreign Application Priority Data

Nov. 20, 2007   (KR) .................. 10-2007-0118770

(51) Int. Cl.
*G02F 1/1333* (2006.01)

(52) U.S. Cl. ......................................................... 349/58
(58) Field of Classification Search ..................... 349/58
See application file for complete search history.

(56) References Cited

U.S. PATENT DOCUMENTS

| 2007/0091222 A1* | 4/2007 | Huo et al. ................. 349/58 |
| 2007/0132905 A1* | 6/2007 | Kim et al. ................ 349/58 |
| 2007/0195221 A1* | 8/2007 | Won et al. ................ 349/58 |

* cited by examiner

*Primary Examiner* — David Nelms
*Assistant Examiner* — Nathanael R Briggs
(74) *Attorney, Agent, or Firm* — Cantor Colburn LLP

(57) ABSTRACT

A liquid crystal display which includes a liquid crystal panel which displays an image, a middle frame in which the liquid crystal panel is positioned, an upper container which is disposed above the middle frame and includes the liquid crystal panel therein along with the middle frame, a lower container which has a bottom surface and a plurality of sidewalls that surround the bottom surface, is disposed below the middle frame and is coupled to the upper container, and at least one connection element which is disposed between the upper container and one of the sidewalls of the lower container and connects the lower container and the upper container.

24 Claims, 10 Drawing Sheets ly, conventionally,
LIQUID CRYSTAL DISPLAY HAVING SEPARATE CONNECTION ELEMENT TO COUPLE UPPER AND LOWER CONTAINERS TOGETHER This application claims priority to Korean Patent Application No. 10-2007-0118770 filed on Nov. 20, 2007, an all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") capable of sharing and the common use of LCD elements regardless of the size of containers for LCDs.

2. Description of the Related Art

LCDs are one of the most widely used flat panel displays ("FPDs"). A conventional LCD includes a liquid crystal panel assembly, which has two panels having a plurality of electrodes formed thereon and a liquid crystal layer interposed between the two panels, and adjusts the amount of light transmitted through the liquid crystal layer by applying voltages to the electrodes so that liquid crystal molecules in the liquid crystal layer can be rearranged.

A conventional LCD may also include a backlight assembly which provides light to a liquid crystal panel. A backlight assembly may be disposed at the rear of a liquid crystal panel and may be coupled to a container, thereby constituting an LCD along with the container.

The designs of LCDs are diverse, and containers for LCDs have come in various sizes, and the demand for the development of various shapes of liquid crystal panels and backlight assemblies has steadily grown. However, conventionally, LCDs including different sizes of containers are generally manufactured separately regardless of whether they include liquid crystal panels of the same size and, thus, the efficiency of manufacture of LCDs is decreased.

BRIEF SUMMARY OF THE INVENTION

The present invention has made an effort to solve the above-stated problems and aspects of the present invention provide a liquid crystal display ("LCD") capable of sharing and the common use of LCD elements regardless of the size of containers for LCDs.

In an exemplary embodiment, the present invention provides an LCD including a liquid crystal panel which displays an image, a middle frame in which the liquid crystal panel is positioned, an upper container which is disposed above the middle frame and includes the liquid crystal panel therein along with the middle frame, a lower container which has a bottom surface and a plurality of sidewalls which surround the bottom surface, is disposed below the middle frame and is coupled to the upper container, and at least one connection element which is disposed between the upper container and one of the sidewalls of the lower container and connects the lower container and the upper container.

In another exemplary embodiment, the present invention provides an LCD including a liquid crystal panel which displays an image, a middle frame in which the liquid crystal panel is positioned, an upper container which is disposed above the middle frame and includes the liquid crystal panel therein along with the middle frame, and a lower container which has a bottom surface and a plurality of sidewalls which surround the bottom surface, is disposed below the middle frame and is coupled to the upper container, wherein the lower container includes a coupling portion which is coupled to at least one connection element, the connection element being disposed between the upper container and one of the sidewalls of the lower container and connecting the lower container and the upper container.

BRIEF DESCRIPTION OF THE DRAWINGS

The above and other aspects, features and advantages of the present invention will become apparent from the following detailed description when taken in conjunction with the accompanying drawings, in which.

DETAILED DESCRIPTION OF THE INVENTION

Figure 1:
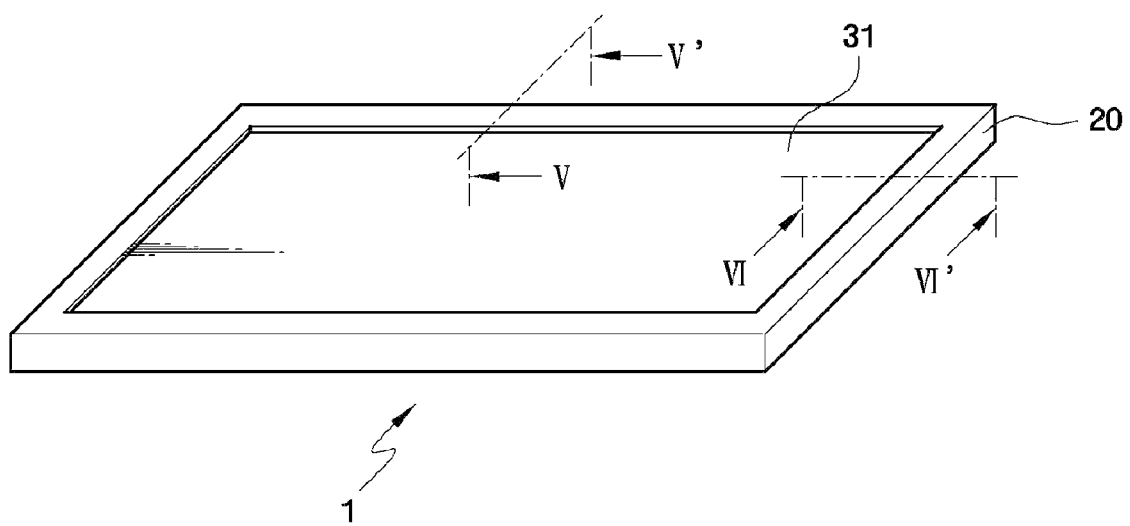
FIG. 1 illustrates a perspective view of an exemplary embodiment of a liquid crystal display (LCD) according to the present invention.

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 3:
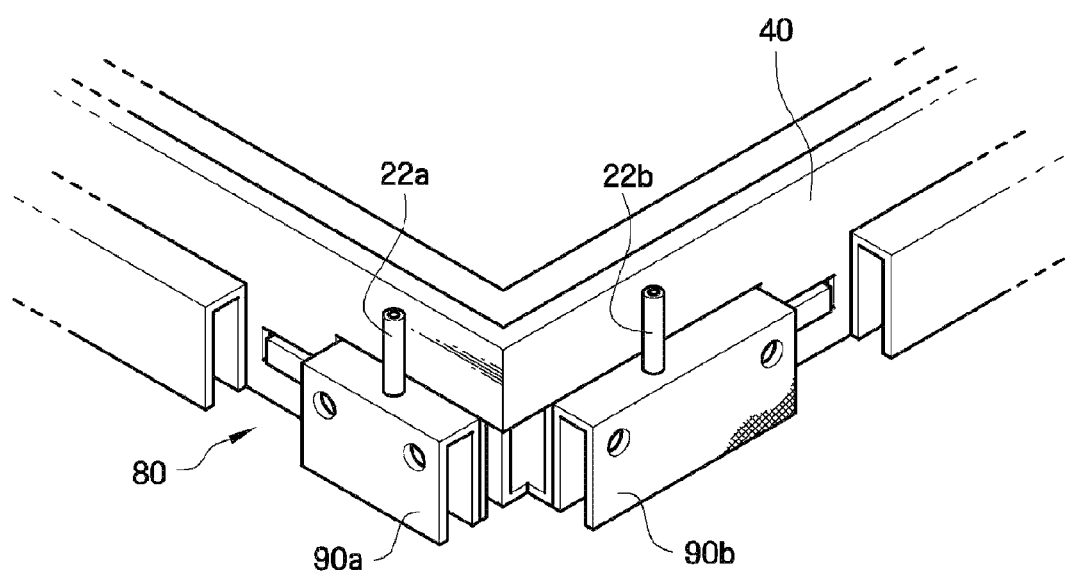
FIG. 3 illustrates a perspective view of an exemplary embodiment of a middle frame and a lower container of the LCD shown in FIG. 1.
Figure 4:
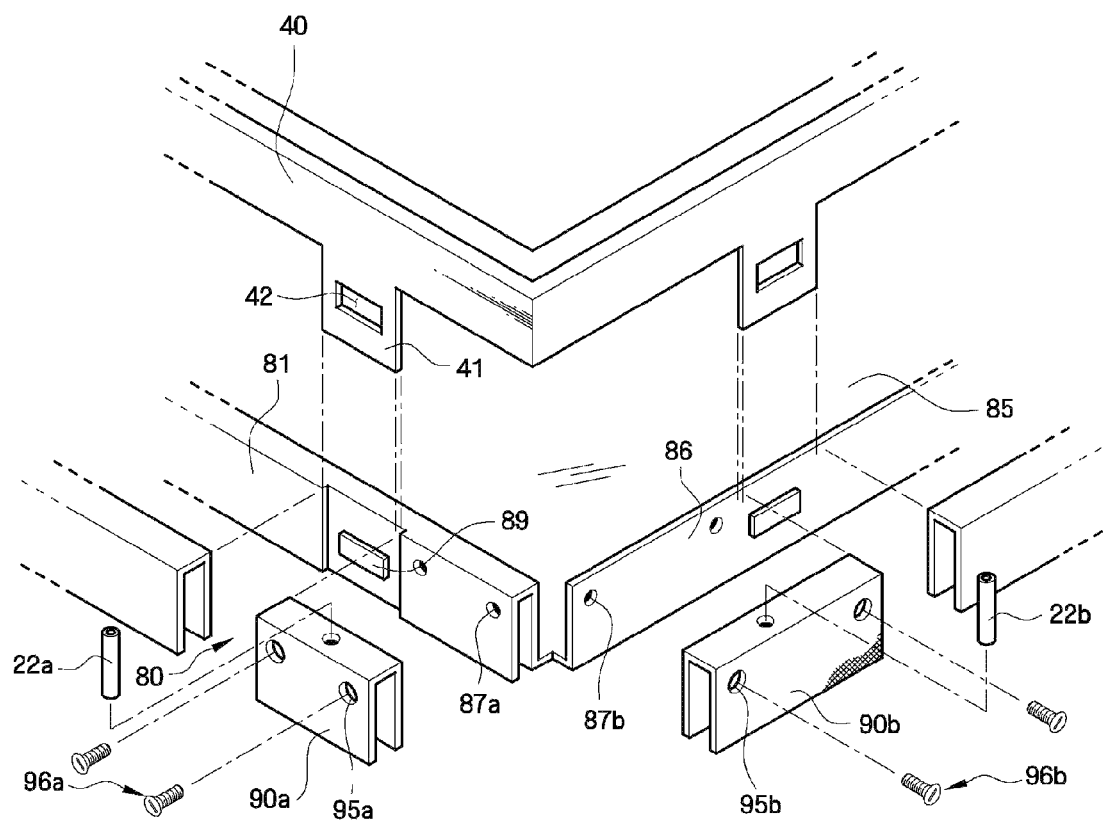
FIG. 4 illustrates an exploded perspective view of an exemplary embodiment of the middle frame and the lower container shown in FIG. 3.
Figure 5:
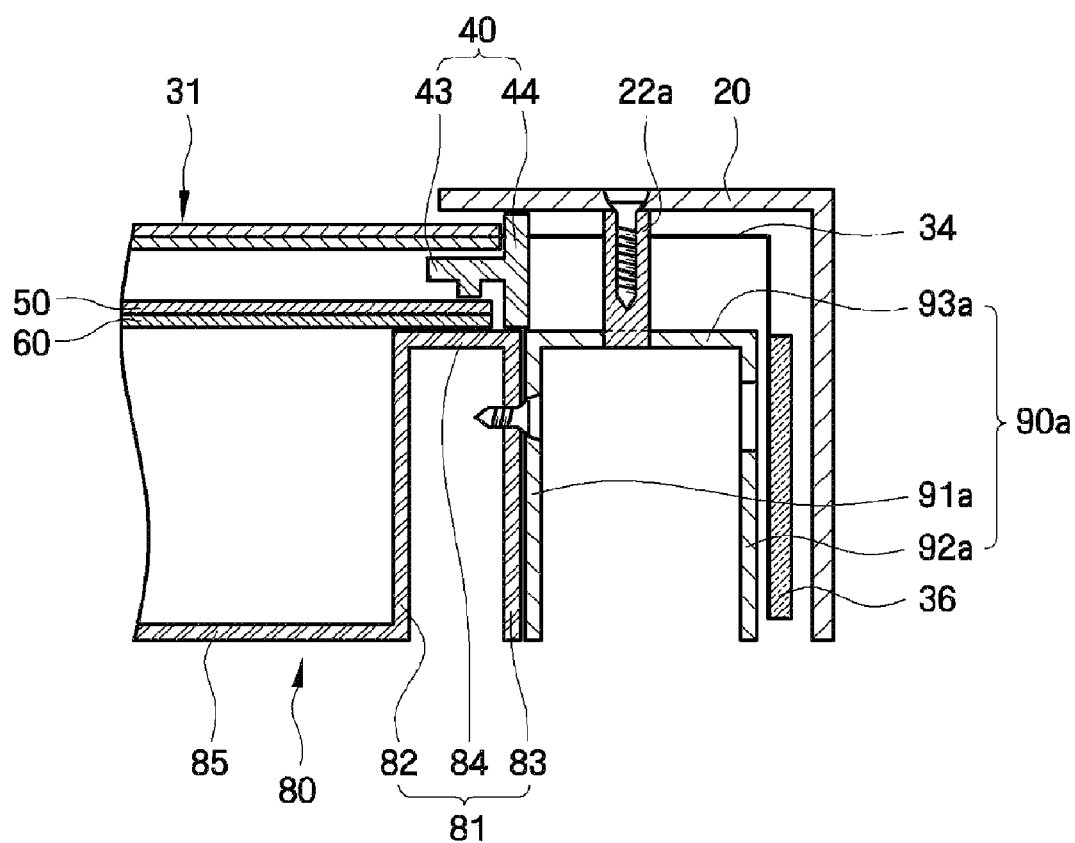
FIG. 5 illustrates a cross-sectional view taken along line V-V' of FIG. 1.
Figure 6:
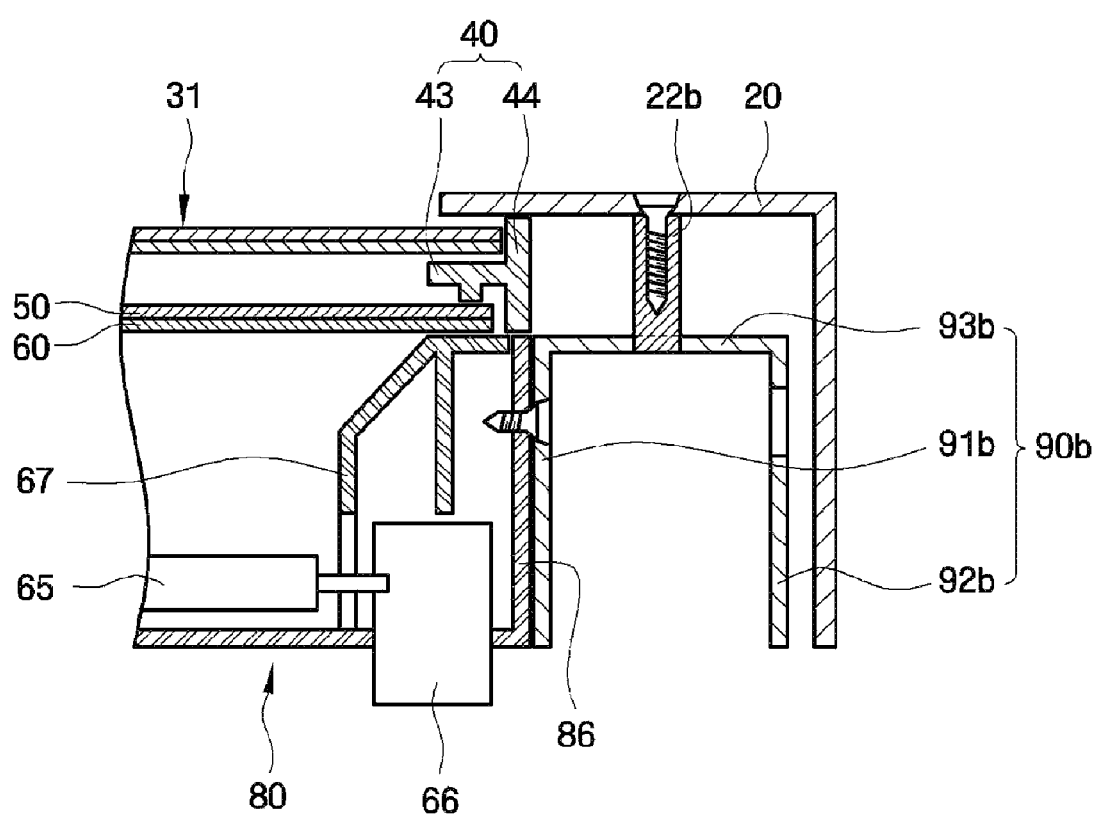
FIG. 6 illustrates a cross-sectional view taken along line VI-VI' of FIG. 1.

Hereinafter, exemplary embodiments of the present invention will be described in detail with reference to the accompanying drawings. A liquid crystal display according to an exemplary embodiment of the present invention will hereinafter be described in detail with reference to FIGS. 1 through 6. FIG. 1 illustrates a perspective view of an LCD 1 according to an exemplary embodiment of the present invention, FIG. 2 illustrates an exploded perspective view of the LCD 1, FIG. 3 illustrates a perspective view of a middle frame 40 and a lower container 80 of the LCD 1, FIG. 4 illustrates an exploded perspective view of the middle frame 40 and the lower container 80, FIG. 5 illustrates a cross-sectional view taken along line V-V' of FIG. 1, and FIG. 6 illustrates a cross-sectional view taken along line VI-VI' of FIG. 1.

Figure 2:
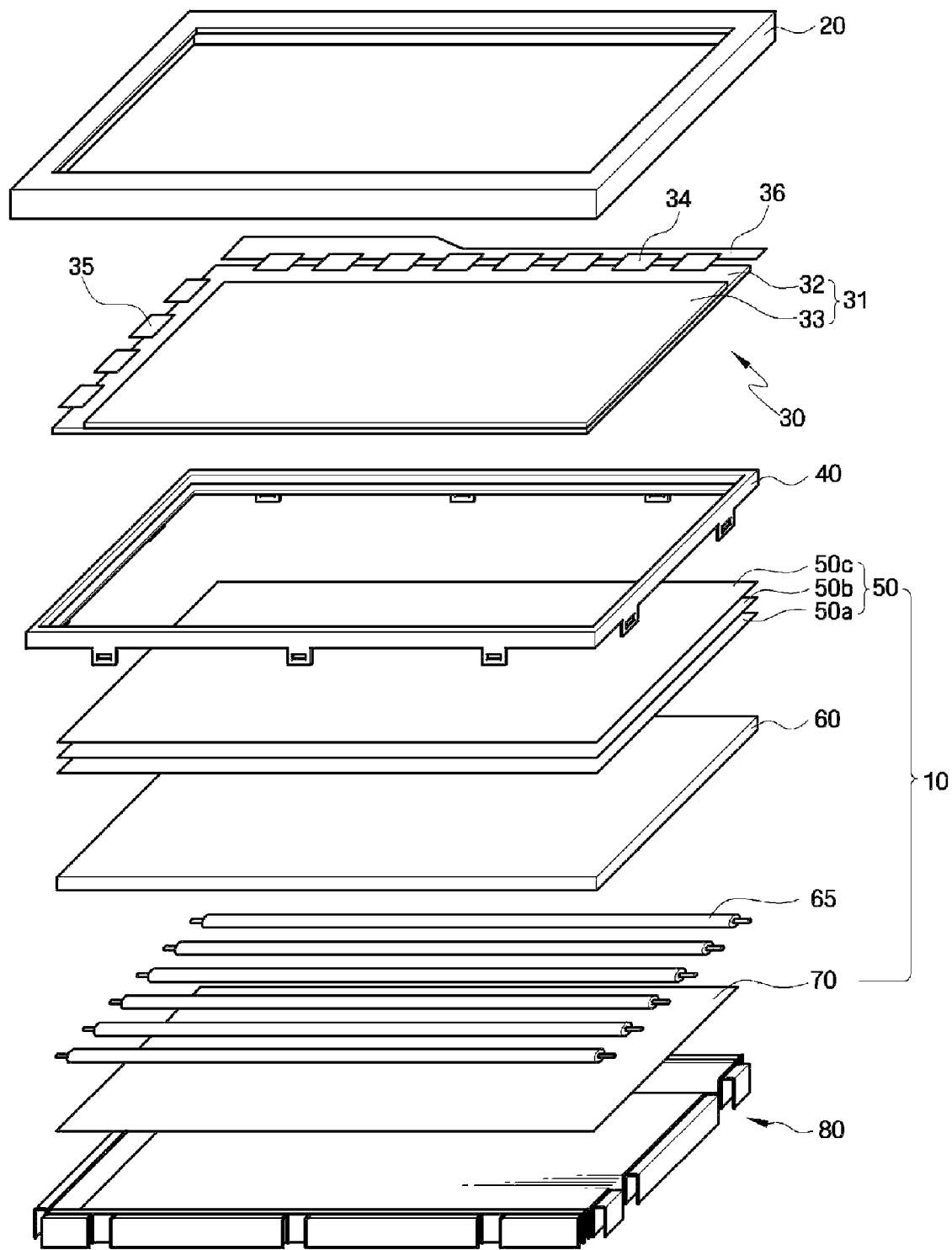
FIG. 2 illustrates an exploded perspective view of the LCD shown in FIG. 1.

Referring to FIGS. 1 and 2, the LCD 1 includes a liquid crystal panel assembly 30, a backlight assembly 10, the middle frame 40, an upper container 20, and the lower container 80.

The liquid crystal panel assembly 30 includes a liquid crystal panel 31, a liquid crystal layer (not shown), a plurality of gate tape carrier packages ("TCPs") 35, a plurality of data TCPs 34 and a printed circuit board ("PCB") 36. The liquid crystal panel 31 includes a lower display panel 32 and an upper display panel 33.

The lower display panel 32 includes a plurality of gate lines (not shown), a plurality of data lines (not shown), a thin-film transistor (TFT) array (not shown), and a plurality of pixel electrodes (not shown). The upper display panel 33 includes a color filter, a black matrix and a plurality of common electrodes, and faces the lower display panel 32. The color filter and the common electrodes may be disposed on the lower display panel 32, instead of being disposed on the upper display panel 33.

The gate TCPs 35 are respectively connected to the gate lines on the lower display panel 32, and the data TCPs 34 are respectively connected to the data lines on the lower display panel 32.

Various driving elements which apply a gate-driving signal to the gate TCPs 35, apply a data driving signal to the data TCPs 34 or process the gate-driving signal and the data driving signal may be mounted on the PCB 36.

The backlight assembly 10 includes a plurality of optical sheets 50, a diffusive plate 60, a plurality of lamps 65 and a reflective plate 70.

The lamps 65 provide light to the liquid crystal panel 31. According to an exemplary embodiment, the backlight assembly 10 includes at least one lamp 65. Line light sources such as cold cathode fluorescent lamps ("CCFLs"), hot cathode fluorescent lamps ("HCFLs") may be used as the lamps 65. Alternatively, point light sources such as light-emitting diodes ("LEDs") may be used as the lamps 65. For convenience, assume that the backlight assembly 10 is a direct-type backlight assembly, in which one or more lamps 65 are disposed directly below a liquid crystal panel 31 and thus, light emitted from the lamps 65 reaches the liquid crystal panel 31 through a diffusive plate 60 and one or more optical sheets 50. However, the present invention is not limited to any particular type of backlight assembly and may vary accordingly. For example, the present invention can be applied to an edge-type backlight assembly in which one or more lamps are disposed on one side of the corresponding backlight assembly and thus light emitted from the lamps needs to be guided by a light guide plate in order to be provided to a liquid crystal panel.

The diffusive plate 60 diffuses light emitted from the lamps 60 in various directions. As shown in FIG. 2, the diffusive plate 60 may be disposed above the lamps 65 and therefore, prevents bright lines from being generated by the lamps 65.

The optical sheets 50 may be disposed on the diffusive plate 60. The optical sheets 50 diffuse and collect light emitted from the lamps 65. According to an exemplary embodiment, the optical sheets 50 may be disposed above the lamps 65 and may be contained in the middle frame 40. The optical sheets 50 include a first prism sheet 50a, a second prism sheet 50b and a protective sheet 50c.

The first and second prism sheets 50a, 50b improve the luminance of the LCD 1 within the range of valid viewing angles by refracting light transmitted through the diffusive plate 60 and thus concentrating light incident thereupon at low incidence angles in front of the LCD 1. The protective sheet 50c, which is disposed on the first and second prism sheets 50a, 50b, protects the first and second prism sheets 50a, 50b. In addition, the protective sheet 50c diffuses light and thus uniformly distributes the light. However, the structure of the optical sheets 50 is not limited to that set forth herein. That is, the structure of the optical sheets 50 may vary accordingly.

The reflective sheet 70 may be disposed below the lamps 65. The reflective sheet 70 may reflect light emitted from the lamps 65 toward the liquid crystal panel 31, thereby improving the efficiency of light.

Referring to FIGS. 2 through 6, the middle frame 40 includes the liquid crystal panel assembly 30 and the backlight assembly 10 therein by being coupled to the upper container 20 and the lower container 80. According to the current exemplary embodiment, the middle frame 40 is formed as a rectangular frame including four sidewalls 44 and a plurality of settling portions 43. The liquid crystal panel 31 may be settled on the settling portions 43, and the backlight assembly 10 may be contained in the middle frame 40 below the setting portions 43. The middle frame 40 may be formed as a plastic mold frame in order to prevent damage to elements contained therein. The settling portions 43 may extend inwardly from the sidewalls 44. The liquid crystal panel 31 may be disposed on the settling portions 43 and may be fixed laterally in the middle frame 40 by being in contact with the sidewalls 44. According to an exemplary embodiment, the length and width of the liquid crystal panel 31 may be less than the length and width, respectively, of the middle frame 40 by the width of the sidewalls 44. That is, in the current exemplary embodiment, the liquid crystal panel 31 overlaps the entire middle frame 40 except for the sidewalls 44.

The middle frame 40 also includes a plurality of second coupling elements 41 which couple the middle frame 40 to the lower container 80. The coupling elements 41 may be formed under the sidewalls 44 and may be hook-coupled to the lower container 80. A plurality of coupling grooves 42 are formed in the respective second coupling elements 41. One or more coupling protrusions 89 may be formed on each of a plurality of sidewalls (81 and 86) of the lower container 80 and may be inserted into the respective coupling grooves 42.

The lower container 80 contains the backlight assembly 10 therein by being coupled to the middle frame 40 and the upper container 20. The lower container 80 includes a bottom surface 85 and the sidewalls (81 and 86) which are formed along the edges of the bottom surface 85. The bottom surface 85 is flat and is thus suitable for disposing the reflective sheet 70 thereon. A lamp socket 66 is coupled to the bottom surface 85, and thus a lamp 65 can be placed above the reflective sheet 65.

The sidewalls (81 and 86) of the lower container 80 may be disposed on four sides of the bottom surface 85 and may be integrally formed as a single body with the bottom surface 85. The sidewalls (81 and 86) of the lower container 80 may include a first sidewall 81 which is formed along a latitudinal direction of the bottom surface 85 and a second sidewall 86 which is formed along a longitudinal direction of the bottom surface 85. The first sidewall 81 may have an inner surface 82, an outer surface 83 and a top surface 84. According to an exemplary embodiment, the inner surface 82 may extend substantially perpendicularly from the bottom surface 85. The outer surface 83 may extend in parallel with the inner surface 82 and form the exterior of the lower container 80. The top surface 84 connects the inner surface 82 and the outer surface 83. According to an exemplary embodiment, the first sidewall 81 may have a double-wall structure in which the inner surface 82 and the outer surface 83 are spaced apart with an empty space therebetween, however, the present invention is not limited hereto. That is, alternatively, according to another exemplary embodiment, the sidewalls 82 may have a single-wall structure in which the inner surface 82 and the outer surface 83 are incorporated into a single wall.

The diffusive plate 60 and the optical sheets 50 may be disposed on the top surface 84 of the first sidewall 81. The top surface 84 of the first sidewall 81 may contact the middle frame 40. The width of the top surface 84 of the first sidewall 81 may be determined according to a distance between the inner surfaces and the respective outer surface 83 of the first sidewall 81 or according to the arrangement of the lamps 65. That is, since the width of the first sidewall 81 can be adjusted in order to secure a sufficient space for arranging the lamps 65, the width of the top surface 84 of the first sidewall 81 can also be adjusted appropriately.

The second sidewall 86 is formed along the longitudinal direction of the bottom surface 85 and extends substantially perpendicularly from the bottom surface 85. The second sidewall 86 is disposed near a socket cover 67, which covers the lamp socket 66 and has a reflective outer surface. Thus, the second sidewall 86 has sufficient rigidity even when having a single-wall structure and having a same thickness as that of the bottom surface 85. According to an exemplary embodiment, the first sidewall 81 may have a single-wall structure, and the second sidewalls 86 may have a double-wall structure.

A connection element 90a may be coupled to the outer surface of the first sidewall 81, and a connection element 90b may be coupled to the outer surface of the second sidewall 86. The connection elements 90a and 90b enable the middle frame 40 and the lower container 80 to be coupled to various sizes of upper containers 20.

The connection elements 90a and 90b may include first surfaces 91a and 91b, respectively, second surfaces 92a and 92b, respectively, and third surfaces 93a and 93b, respectively. The first surfaces 91a and 91b may be respectively coupled to the outer surfaces 83 of the first and second sidewalls 81 and 86. The second surfaces 92a and 92b face the first surfaces 91a and 91b, respectively, and may be substantially parallel to the first surfaces 91a and 91b. The second surfaces 92a and 92b may be disposed near the inner surfaces of the sidewalls of the upper container 20. An empty space may be formed between the first surface 91a and the second surface 92a or between the first surface 91b and the second surface 92b. Alternatively, according to another exemplary embodiment, the connection elements 90a and 90b may not be formed as being hollow so that no empty space can exist between the first surface 91a and the second surface 92a and between the first surface 91b and the second surface 92b. Further, the connection elements 90a and 90b may also include the third surfaces 93a and 93b, respectively. According to the current exemplary embodiment, the third surface 93a is disposed between the first surface 91a and the second surface 92a, and the third surface 93b is disposed between the first surface 91b and the second surface 92b. The first and second surfaces 91a and 92a extends from the third surface 93a toward a same direction, and the first and second surfaces 91b and 92b extends from the third surface 93b toward a same direction.

The connection elements 90a and 90b extend the lower container 80 and thus enable the lower container 80 to be coupled to various upper containers having different sizes. The connection elements 90a and 90b may be coupled to the lower container 80 by a plurality of screws 96a and 96b. For this, the lower container 80 may include a plurality of screw holes 87a and 87b, which are formed on the first sidewall 81 and the second sidewall 86, respectively. The screws 96a and 96b may be respectively inserted into and fixed in the screw holes 87a and 87b through the through holes 95a and 95b of the connection elements 90a and 90b, however, the present invention is not limited hereto, and may vary accordingly.

That is, the connection elements 90a and 90b may be coupled to the lower container 80 by using a method other than that involving the use of screws. For example, the connection elements 90a and 90b may be coupled to the lower container 80 by using a welding method.

The connection elements 90a and 90b may be connected to the upper container 20 through first coupling elements 22a and 22b (see FIG. 3, for example), respectively. Female threads are formed on the inner circumferential surface of each of the first coupling elements 22a and 22b. The first coupling elements 22a and 22b may be coupled into the connection elements 90a and 90b by interference fit. That is, the connection elements 90a and 90b may be coupled to the first coupling elements 22a and 22b by interference fit, respectively, and the first coupling elements 22a and 22b may be screw-coupled to the upper container 20, however, the present invention is not limited hereto, and may vary accordingly. That is, the first coupling elements 22a and 22b may be coupled to the upper container 20 in various manners, other than that set forth herein.

The first coupling elements 22a and 22b may be coupled to the front of the upper container 20. The front of the upper container 20 corresponds to the direction in which an image is displayed by the liquid crystal panel 31. However, the present invention is not restricted to this. That is, the first coupling elements 22a and 22b may be coupled to a lateral surface of the upper container 20.

According to an exemplary embodiment, the height of the first and second connection elements 90a and 90b may be a same height as the height of the first and second sidewalls 81 and 86. According to another exemplary embodiment, the height of the first and second connection elements 90a and 90b may be appropriately adjusted so that the third surfaces 93a and 93b contacts the upper container 20, and that the first and second connection elements 90a and 90b can be coupled to the upper container 20 without the use of the first coupling elements 22a and 22b. The connection elements 90a and 90b may be formed of a metal through bending so that the connection elements 90a and 90b can have the first surfaces 91a and 91b, respectively, the second surfaces 92a and 92b, respectively, and the third surfaces 93a and 93b, respectively.

More than one connection element 90a may be formed on the first sidewall 81, and more than one connection element 90b may be formed on the second sidewall 86. Specifically, according to an exemplary embodiment, only one connection element 90a may be formed on the first sidewall 81 and extend long in a latitudinal direction of the first sidewall 81, and only one connection element 90b may be formed on the second sidewall 86 and extend long in a latitudinal direction of the second sidewall 86. Alternatively, each of the connection elements 90a and 90b may be divided into a plurality of parts, and the parts of each of the connection elements 90a and 90b may be disposed among the second coupling elements 41.

The connection element 90a may account for only part of the first sidewall 81, and the connection element 90b may account for only part of the second sidewall 86. Specifically, the connection elements 90a and 90b may be disposed on only certain portions of the lower container 80 necessary for coupling the lower container 80 to the upper container 20. For example, the connection elements 90a and 90b may be provided near each of the corners of the lower container 80. The length and the positions of the connection elements 90a and 90b may vary according to the size and shape of the upper container 20.

Figure 7:
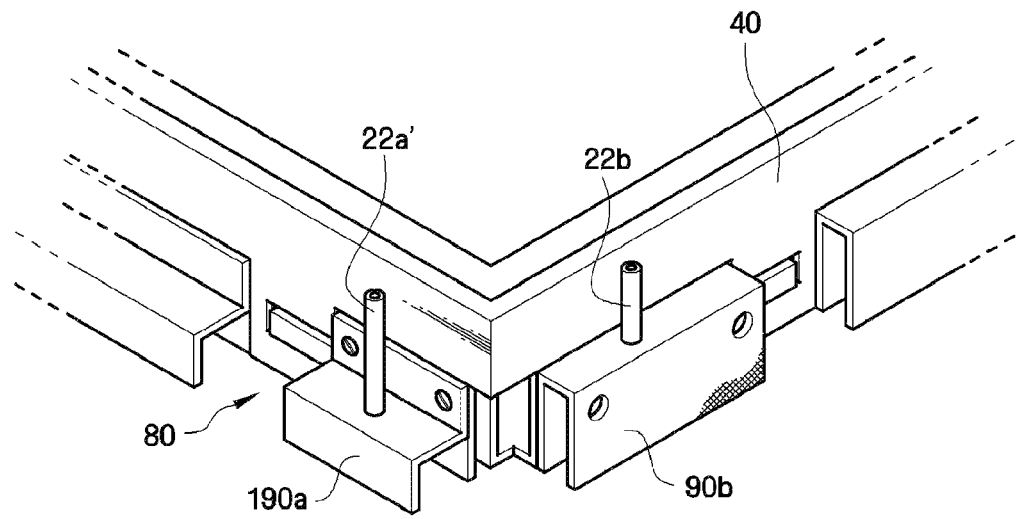
FIG. 7 illustrates a perspective view of another exemplary embodiment of a middle frame and a lower container of an LCD according to the present invention.
Figure 8:
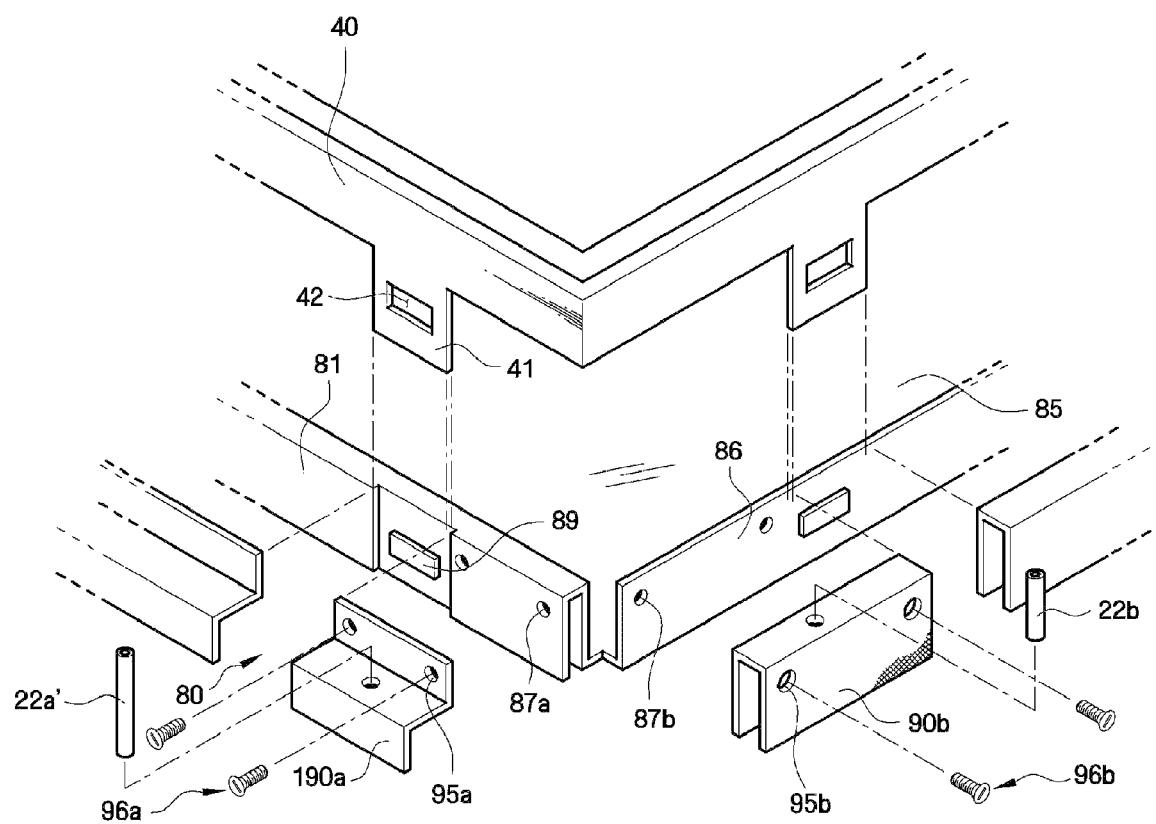
FIG. 8 illustrates an exploded perspective view of an exemplary embodiment of the middle frame and the lower container shown in FIG. 7.
Figure 9:
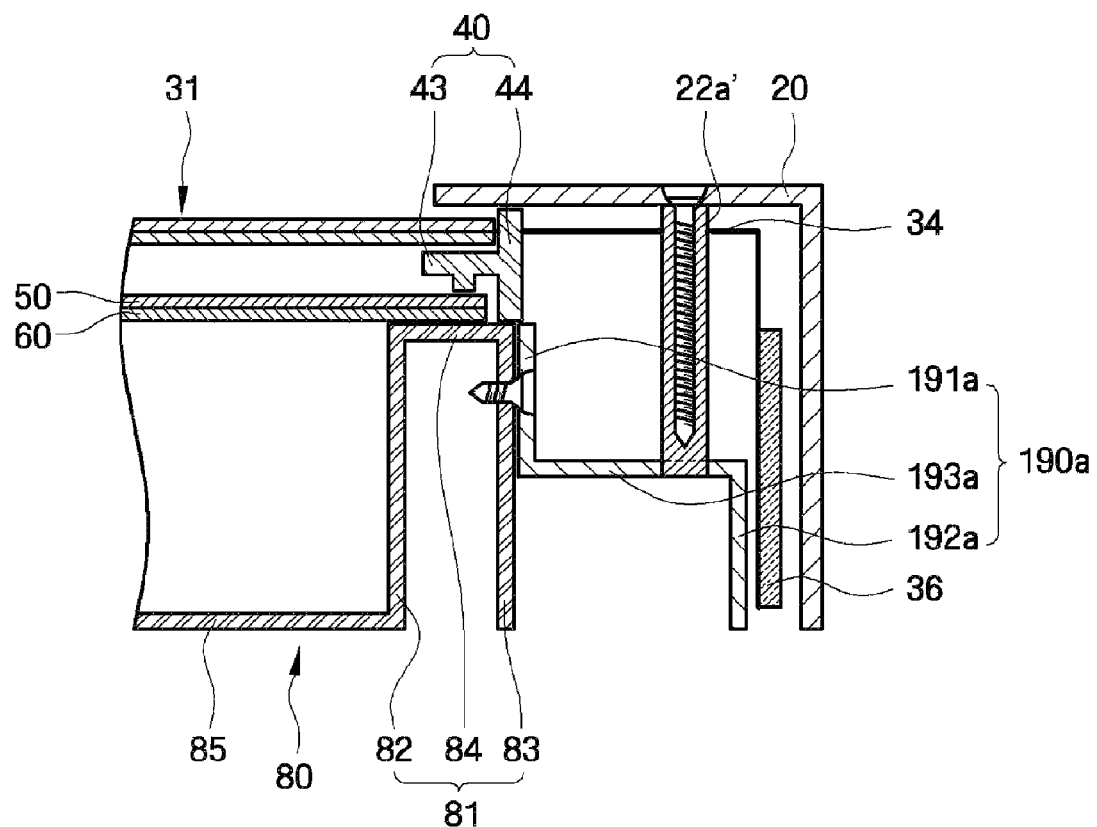
FIG. 9 illustrates a cross-sectional view of the LCD shown in FIG. 7.

An LCD according to another exemplary embodiment of the present invention will hereinafter be described in detail with reference to FIGS. 7 through 9. FIG. 7 illustrates a perspective view of a middle frame 40 and a lower container 80 of an LCD according to another embodiment of the present invention, FIG. 8 illustrates an exploded perspective view of the middle frame 40 and the lower container 80 illustrated in FIG. 7, and FIG. 9 illustrates a cross-sectional view of the LCD illustrated in FIG. 7. In FIGS. 1 through 9, like reference numerals indicate like elements.

Referring to FIGS. 7 through 9, the LCD includes a connection element 190a which has a first surface 191a, a second surface 192a and a third surface 193a. The first and second surfaces 191a and 192a extend from the third surface 193 toward different directions. The connection element 190a may be coupled to a first sidewall 81, however, the present invention is not limited hereto, and may vary accordingly. That is, the connection element 190a may be coupled to a second sidewall 86.

The connection element 190a has the first surface 191a, which contacts an outer surface of the first sidewall 81, the second surface 192a, which extends in parallel to the first surface 191a, and the third surface 193a, which connects the first surface 191a and the second surface 192a. The first and second surfaces 191a and 192b extend from the third surface 193a toward different directions and thus have a step difference. That is, according to an exemplary embodiment, the connection element 190a may be formed as a step. Thus, a top surface 84 of the first sidewall 81 has a step difference with the third surface 193a. The connection element 190a may be formed by appropriately bending a metal plate.

A first coupling element 22a' may be coupled between the connection element 190a and the upper container 20. A first end of the first coupling element 22a' may be inserted into the connection element 190a through the third surface 193a by interference fit. A second end of the first coupling element 22a' may be screw-coupled to the upper container 20. Only one connection element 190a may be formed on the first sidewall 81 and extend long in a latitudinal direction of the first sidewall 81. Alternatively, according to another exemplary embodiment, the connection element 190a may be divided into a plurality of parts.

The connection element 190a is disposed between the lower container 80 and the upper container 20 and couples the lower container 80 to the upper container 20. Thus, the shape of the connection element 190a may be altered according to the size and shape of the upper container 20. The connection element 190a may be suitable for use when the upper container 20 includes a step portion or is formed in a curved shape and thus, there is only a little space between the upper container 20 and the lower container 80. The shape of the connection element 190 may be altered according to whether to mount a PCB 36 or interconnection layers between the lower container 80 and the upper container 20.

Figure 10:
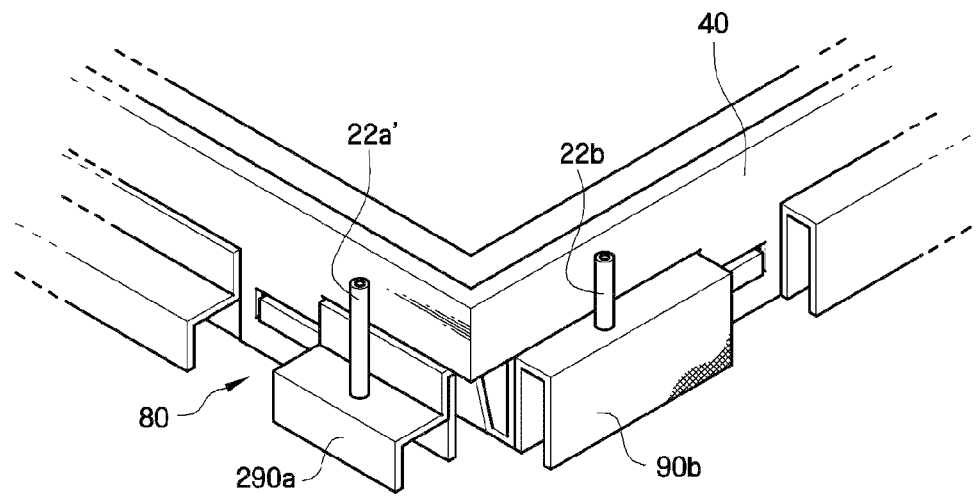
FIG. 10 illustrates a perspective view of another exemplary embodiment of a middle frame and a lower container of an LCD according to the present invention.
Figure 11:
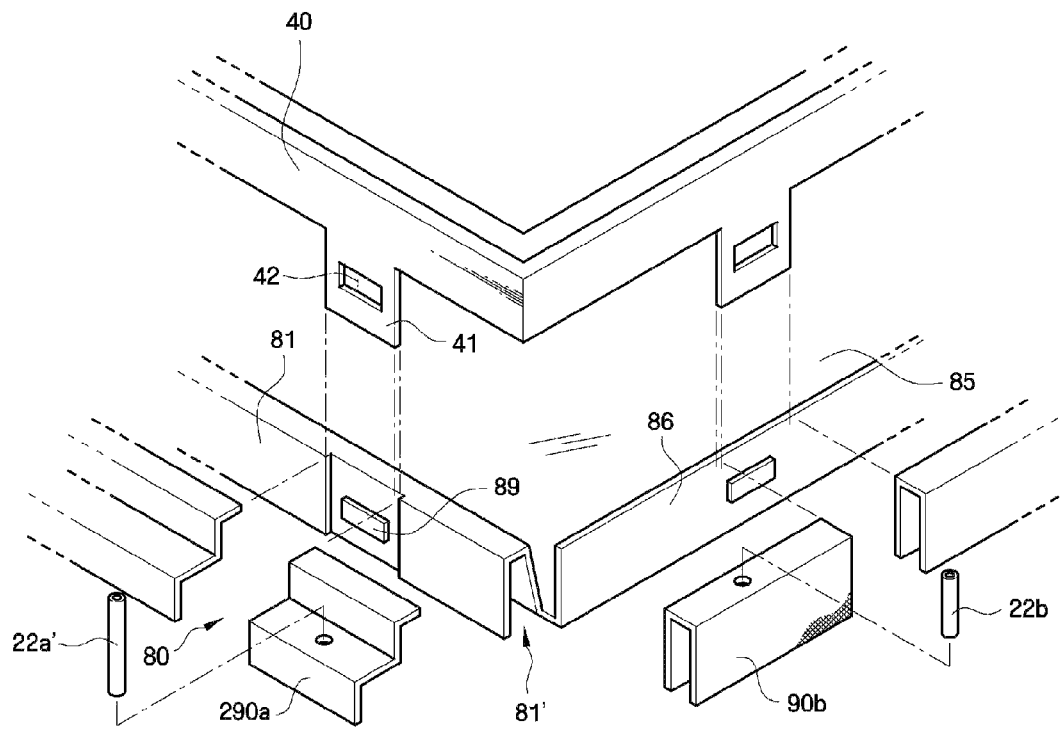
FIG. 11 illustrates an exploded perspective view of an exemplary embodiment of the middle frame and the lower container shown in FIG. 10.
Figure 12:
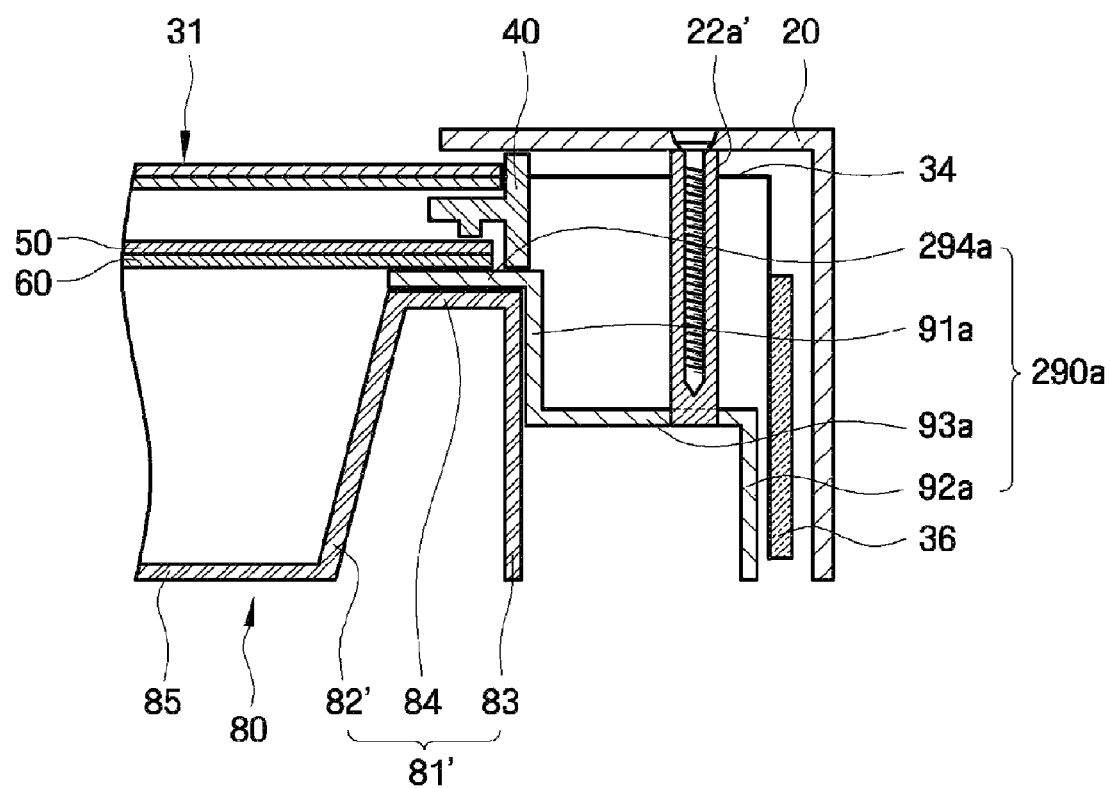
FIG. 12 illustrates a cross-sectional view of the LCD shown in FIG. 10.

An LCD according to yet another exemplary embodiment of the present invention will hereinafter be described in detail with reference to FIGS. 10 through 12. FIG. 10 illustrates a perspective view of a middle frame 40 and a lower container 80 of an LCD according to another embodiment of the present invention, FIG. 11 illustrates an exploded perspective view of the middle frame 40 and the lower container 80 illustrated in FIG. 10, and FIG. 12 illustrates a cross-sectional view of the LCD illustrated in FIG. 10. In FIGS. 1 through 6 and 10 through 12, like reference numerals indicate like elements.

Referring to FIGS. 10 through 12, the LCD includes a connection element 290a including a fourth surface 294a that is coupled to a top surface 84 of a first sidewall 81' of a lower container 80. The connection element 290a may be coupled to the first sidewall 81', however, the present invention is not limited hereto, and may vary accordingly. That is, the connection element 290a may be coupled to a second sidewall 86.

The lower container 80 includes the first sidewall 81' and the second sidewall 86. Since a bottom surface 85 of the lower container 80 and an inner surface 82' of the first sidewall 81' serve as reflective surfaces that reflect light emitted from lamps 65, the inner surface 82' of the first sidewall 81' may be inclined at a predetermined angle in order to increase the efficiency of reflection of light.

The connection element 290a also includes a first surface 91a, a second surface 92a, and a third surface 93a. The first and second surfaces 91a and 91b extend from the third surface 93a toward different directions. The fourth surface 94a extends from the first surface 91a and is coupled to the top surface 84 of the lower container 80. That is, a first end of the first surface 291a is connected to the third surface 93a, and a second end of the first surface 291a is connected to the fourth surface 294a. Since the fourth surface 294a is coupled between the middle frame 40 and the lower container 80 and the top surface 84 and an outer surface 83 of the first sidewall 81' are coupled to the connection element 290a, the middle frame 40 and the lower container 80 can be firmly coupled to each other. According to an exemplary embodiment, the third surface 93a and the fourth surface 294a may be coupled to the first sidewall 81' by using a screw or using a welding method.

The connection element 290a can be easily coupled to the lower container 80 even when the first sidewall 81' has only the inner surface 82' and the top surface 84, i.e., the first sidewall 81' includes a single-wall structure. That is, even when the first sidewall 81' is inclined toward the lamps 65 or inclined inwardly, the connection element 290a can be firmly fixed to the lower container 80 since the top surface 84 contacts the fourth surface 294a of the connection element 294a. The method in which the connection element 290a and the upper container 20 are coupled together is the same as those in the embodiments of FIGS. 1 through 6 and 7 through 9.

As described above, according to an exemplary embodiment of the present invention, it is possible to enable the sharing and the common use of LCD elements regardless of the size of containers for LCDs, to reduce the manufacturing cost and time of LCDs, and to improve the efficiency of the production of LCDs.

While the present invention has been shown and described with reference to some exemplary embodiments thereof, it should be understood by those of ordinary skill in the art that various changes in form and details may be made therein without departing from the spirit and scope of the present invention as defined by the appending claims.

What is claimed is:

1. A liquid crystal display comprising:
a liquid crystal panel which displays an image;
a middle frame in which the liquid crystal panel is positioned;
an upper container which is disposed above the middle frame and comprises the liquid crystal panel therein along with the middle frame;
a lower container which comprises a bottom surface and a plurality of sidewalls which surround the bottom surface, the lower container is disposed below the middle frame; and
at least one connection element which is disposed between the upper container and one of the sidewalls of the lower container and is coupled to both the lower container and the upper container, the connection element comprising first surface which contacts the one of the sidewalls of the lower container, a second surface which is spaced apart from the first surface, and a third surface which connects the first surface and the second surface,
wherein the connection element is separate from the upper container and the lower container, and
wherein the third surface of the connection extends away from the one of the sidewalk of the lower container.

2. The liquid crystal display of claim 1, wherein the connection element comprises a first surface which contacts one of the sidewalls of the lower container, a second surface which is spaced apart from the first surface, and a third surface which connects the first surface and the second surface.

3. The liquid crystal display of claim 2, wherein the first and second surfaces extend from the third surface toward a same direction.

4. The liquid crystal display of claim 2, wherein the first and second surfaces extend from the third surface toward different directions.

5. The liquid crystal display of claim 2, further comprising a first coupling element which couples the connection element to the upper container.

6. The liquid crystal display of claim 5, wherein the first coupling element couples the third surface of the connection element to the upper container.

7. The liquid crystal display of claim 1, wherein the sidewalls of the lower container form a single-wall structure.

8. The liquid crystal display of claim 1, wherein the sidewalls of the lower container form a double-wall structure and include an empty space therein.

9. The liquid crystal display of claim 2, wherein the first and second surfaces are bent from the third surface.

10. The liquid crystal display of claim 3, wherein the first, second and third surfaces are formed through bending.

11. The liquid crystal display of claim 1, wherein the connection element comprises a first surface which contacts one of the sidewalls of the lower container, a second surface which is spaced apart from the first surface and is parallel to the first surface, a third surface which connects the first surface and the second surface, and a fourth surface which extends from the first surface upward one of the sidewalls of the lower container.

12. The liquid crystal display of claim 11, wherein the third and fourth surfaces comprise a step difference.

13. The liquid crystal display of claim 1, further comprising a printed circuit board which is disposed between the upper container and one of the sidewalls of the lower container and applies signals to the liquid crystal panel.

14. The liquid crystal display of claim 6, wherein the middle frame comprises a second coupling element which couples the middle frame to the lower container.

15. The liquid crystal display of claim 14, wherein the second coupling element is hook-coupled to the lower container.

16. The liquid crystal display of claim 14, wherein the connection element is divided into a plurality of parts, which are disposed on both sides of the second coupling element.

17. The liquid crystal display of claim 14, wherein the connection element is screw-coupled to the lower container.

18. The liquid crystal display of claim 1, wherein the middle frame comprises a plurality of sidewalls and a plurality of settling portions which extend from inner surfaces of the sidewalls of the middle frame, and the liquid crystal panel overlaps a total surface of the middle frame except for the sidewalls of the middle frame.

19. The liquid crystal display of claim 1, wherein the lower container comprises a coupling portion which is coupled to at least one connection element, the connection element being disposed between the upper container and one of the sidewalls of the lower container and connecting the lower container and the upper container.

20. A liquid crystal display comprising:
a liquid crystal panel which displays an image;
a middle frame in which the liquid crystal panel is positioned;
an upper container which is disposed above the middle frame and comprises the liquid crystal panel therein along with the middle frame; and
a lower container which comprises a bottom surface and a plurality of sidewalls that surround the bottom surface, the lower container being disposed below the middle frame,
wherein the lower container comprises a coupling portion which is coupled to at least one connection element, the connection element being disposed between the upper container and one of the sidewalls of the lower container and the connecting element being coupled to both of the lower container and the upper container,
wherein the connection element is separate from the upper container and the lower container, and
wherein the connection element comprises a first surface which contacts the one of the sidewalk of the lower container, a second surface which is spaced apart from the first surface, and a third surface which connects the first surface and the second surface, the third surface extending away from the one of the sidewalls of the lower container.

21. The liquid crystal display of claim 20, wherein the coupling portion is a screw hole.

22. The liquid crystal display of claim 20, wherein the middle frame comprises a plurality of sidewalls and a plurality of settling portions which extend from an inner surfaces of the sidewalls of the middle frame, and the liquid crystal panel overlaps a total surface of the middle frame except for the sidewalls of the middle frame.

23. The liquid crystal display of claim 1, wherein the connection element defines a space between the upper container and the sidewall of the lower container.

24. The liquid crystal display of claim 20, wherein the connection element defines a space between the upper container and the sidewall of the lower container.

* * * * *